(12) United States Patent
Wang et al.

(10) Patent No.: US 8,849,030 B2
(45) Date of Patent: Sep. 30, 2014

(54) IMAGE RETRIEVAL USING SPATIAL BAG-OF-FEATURES

(75) Inventors: Changhu Wang, Beijing (CN); Zhiwei Li, Beijing (CN); Lei Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 245 days.

(21) Appl. No.: 13/092,786

(22) Filed: Apr. 22, 2011

(65) Prior Publication Data

US 2012/0269432 A1    Oct. 25, 2012

(51) Int. Cl.
  *G06K 9/34* (2006.01)
  *G06K 9/46* (2006.01)
  *G06F 17/30* (2006.01)

(52) U.S. Cl.
  CPC ........ *G06F 17/30259* (2013.01); *G06K 9/4671* (2013.01); *G06K 9/4647* (2013.01)
  USPC ........................................................ 382/171

(58) Field of Classification Search
  None
  See application file for complete search history.

(56) References Cited

U.S. PATENT DOCUMENTS

| | | | |
|---|---|---|---|
| 5,930,392 A | 7/1999 | Ho | |
| 7,263,509 B2 | 8/2007 | Lee et al. | |
| 7,340,089 B2 | 3/2008 | Nair et al. | |
| 7,519,206 B2 | 4/2009 | Mulet-Parada et al. | |
| 2003/0221163 A1* | 11/2003 | Glover et al. | 715/501.1 |
| 2006/0268406 A1 | 11/2006 | McMahon et al. | |
| 2007/0217676 A1 | 9/2007 | Grauman et al. | |
| 2009/0175538 A1* | 7/2009 | Bronstein et al. | 382/173 |
| 2009/0324093 A1 | 12/2009 | Miarecki et al. | |
| 2010/0008581 A1* | 1/2010 | Bressan | 382/177 |
| 2010/0104184 A1* | 4/2010 | Bronstein et al. | 382/170 |
| 2010/0124377 A1 | 5/2010 | Yu et al. | |
| 2010/0223276 A1* | 9/2010 | Al-Shameri et al. | 707/769 |
| 2010/0278420 A1* | 11/2010 | Shet et al. | 382/156 |
| 2012/0194516 A1 | 8/2012 | Newcombe et al. | |
| 2012/0194517 A1 | 8/2012 | Izadi et al. | |
| 2012/0196679 A1 | 8/2012 | Newcombe et al. | |

OTHER PUBLICATIONS

Histogram Analysis for Image Retrieval. R. Brunelli and O. Mich. 2001.*
Beyond Bags of Features: Spatial Pyramid Matching for Recognizing Natural Scene Categories. Svetlana Lazebnik, Cordelia Schmid and Jean Ponce. IEEE 2006.*
Learning Local Image Descriptors. Simon A.J. Winder and Matthew Brown. Jun. 2007.*
Andoni et al., "Near-Optimal Hashing Algorithms for Approximate Nearest Neighbor in High Dimensions," retrieved at <<http://people.csail.mit.edu/indyk/p117-andoni.pdf>>, Communications of the ACM, Jan. 2008/vol. 51, No. 1, 6 pages.

(Continued)

*Primary Examiner* — Stephen R Koziol
*Assistant Examiner* — Delomia Gilliard
(74) *Attorney, Agent, or Firm* — Carole Boelitz; Micky Minhas

(57) ABSTRACT

Local features of retrieved images are identified and for each image, an ordered bag-of-features is created that describes the features of the image. Spatial relationships between features of an image are captured in histogram descriptors created from linear or circular projections. Using the histogram descriptors, ordered bags-of-features describing the features of the images are developed. Calibrating the ordered bags-of-features to account for spatial variance leads to spatial bags-of-features.

18 Claims, 13 Drawing Sheets

(56) References Cited

OTHER PUBLICATIONS

Chum et al., "Total Recall: Automatic Query Expansion with a Generative Feature Model for Object Retrieval," retrieved at <<http://cmp.felk.cvut.cz/~chum/papers/chum07iccv.pdf>>, IEEE 11th International Conference on Computer Vision, Oct. 14-21, 2007, 8 pages.

Freund et al., "An Efficient Boosting Algorithm for Combining Preferences," retrieved at <<http://jmlr.csail.mit.edu/papers/volume4/freund03a/freund03a.pdf>>, Journal of Machine Learning Research 4 (2003) 933-969, Submitted Dec. 2001; Revised Nov. 2002; Published Nov. 2003, 37 pages.

Grauman et al., "The Pyramid Match Kernel Discriminative Classification with Sets of Image Features," retrieved at <<http://www.vision.caltech.edu/Image_Datasets/Caltech101/grauman_darrell_iccv05.pdf>>, In Proceedings of the IEEE International Conference on Computer Vision, Beijing, China, Oct. 2005, 8 pages.

Gudivada, "OR-String: A Geometry-Based Representation for Efficient and Effective Retrieval of Images by Spatial Similarity," retrieved at <<http://ieeexplore.ieee.org/stamp/stamp.jsp?tp=&arnumber=687982>>, IEEE Transactions on Knowledge and Data Engineering, vol. 10, No. 3, May/Jun. 1998, 9 pages.

Jegou et al., "Packing Bag-of Features," retrieved at <<http://lear.inrialpes.fr/pubs/2009/JDS09b/jegou_packingbof.pdf>>, IEEE 12th International Conference on Computer Vision, Sep. 29-Oct. 2, 2009, 8 pages.

Lazebnik et al., "Beyond Bags of Features Spatial Pyramid Matching for Recognizing Natural Scene Categories," retrieved at <<http://ieeexplore.ieee.org/stamp/stamp.jsp?tp=&arnumber=1641019>>, Proceedings of the 2006 IEEE Computer Society Conference on Computer Vision and Pattern Recognition, (c) 2006, 8 pages.

Liu et al., "Integrated Feature Selection and Higher-order Spatial Feature Extraction for Object Categorization," retrieved at <http://sites.google.com/site/dliucmu/CVPR08progressive.pdf>>, IEEE Conference on Computer Vision and Pattern Recognition, Jun. 23-28, 2008, 8 pages.

Lowe, "Distinctive Image Features from Scale-Invariant Keypoints," retrieved at <<http://www.cs.ubc.ca/~lowe/papers/ijcv04.pdf>>, Accepted for publication in the International Journal of Computer Vision, 2004, Jan. 5, 2004, 28 pages.

Marszalek et al., "Spatial Weighting for Bag-of-Features," retrieved at <<http://www.cs.utexas.edu/~grauman/courses/spring2007/395T/papers/marszalek_schmid_cvpr2006.pdf>>, 2006 IEEE Computer Society Conference, Computer Vision and Pattern Recognition, 8 pages.

Mikolajczyk et al., "Scale & Affine Invariant Interest Point Detectors," retrieved at <<http://www.robots.ox.ac.uk/~vgg/research/affine/det_eval_files/mikolajczyk_ijcv2004.pdf>>, International Journal of Computer Vision 60(1), 63-86, (c) Kluwer Academic Publishers. Manufactured in The Netherlands, 24 pages.

Nister et al., "Scalable Recognition with a Vocabulary Tree," retrieved at <<http://ieeexplore.ieee.org/stamp/stamp.jsp?tp=&arnumber=1641018>>, Proceedings of the 2006 IEEE Computer Society Conference on Computer Vision and Pattern Recognition, (c) 2006, 8 pages.

Perdoch et al., "Efficient Representation of Local Geometry for Large Scale Object Retrieval," retrieved at <<http://citeseerx.ist.psu.edu/viewdoc/download;jsessionid=A41EA1FCE528A81B2DEA32B8638C6185?doi=10.1.1.152.6477&rep=rep1&type=pdf>>, IEEE Computer Society Conference on Computer Vision and pattern Recognition, Jun. 20-25, 2009, 8 pages.

Philbin et al., "Lost in Quantization: Improving Particular Object Retrieval in Large Scale Image Databases," retrieved at <<http://ieeexplore.ieee.org/stamp/stamp.jsp?tp=&arnumber=4587635>>, IEEE (c) 2008, 8 pages.

Philbin et al., "Object Retrieval with Large Vocabularies and Fast Spatial Matching," retrieved at <<http://www.robots.ox.ac.uk/~vgg/publications/papers/philbin07.pdf>>, IEEE Computer Society Conference on Computer Vision and Pattern Recognition, Jun. 17-22, 2007, 8 pages.

Sivic et al., "Video Google a Text Retrieval Approach to Object Matching in Videos," retrieved at <<http://www.robots.ox.ac.uk/~vgg/publications/papers/sivic03.pdf>>, Proceedings of the Ninth IEEE International Conference on Computer Vision, (c) 2003, 8 pages.

Wu et al., "Bundling Features for Large Scale Partial-Duplicate Web Image Search," retrieved at <<http://research.microsoft.com/en-us/um/people/jiansun/papers/bunlded_cvpr2009.pdf>>, IEEE Computer Society Conference on Computer Vision and Pattern Recognition, Jun. 20-25, 2009, 8 pages.

Zhang et al., "Descriptive Visual Words and Visual Phrases for Image Applications," retrieved at <<http://users.eecs.northwestern.edu/~ganghua/publication/MM09.pdf>>, MM '09, Oct. 19-24, 2009, Beijing, China, (c) 2009 ACM, 10 pages.

Zhang et al., "Efficient Indexing for Large Scale Visual Search," retrieved at <<http://research.microsoft.com/en-us/um/people/leizhang/Paper/ICCV09_Xiao.pdf>>, IEEE 12th International Conference on Computer Vision, Sep. 29-Oct. 2, 2009, 8 pages.

"International Search Report & Written Opinion for PCT Patent Application No. PCT/US2013/077736", Mailed Date: Mar. 27, 2014, Filed Date: Dec. 26, 2013, 15 Pages.

Higo, et al., "A Hand-held Photometric Stereo Camera for 3-D Modeling", In International Conference on Computer Vision, Sep. 29, 2009, pp. 1234-1241.

Anderson, et al., "Augmenting Depth Camera Output Using Photometric Stereo", In Conference on Machine Vision Applications, Jun. 13, 2011, pp. 369-372.

"International Search Report & Written Opinion for PCT Patent Application No. PCT/US2014/016749", Mailed Date: May 12, 2014, Filed Date: Feb. 18, 2014, 8 pages.

Daniel Wagner, et al., "Pose Tracking from Natural Features on Mobile Phones", In IEEE/ACM International Symposium on Mixed and Augmented Reality, Sep. 15, 2008, pp. 125-134.

Breiman, Leo, "Random Forests", In Machine Learning, vol. 45, Issue 1, Oct. 2001, pp. 5-32.

Veas, et al., "Creating Meaningful Environment Models for Augmented Reality", In IEEE Virtual Reality Conference, Mar. 8, 2008, pp. 295-296.

\* cited by examiner

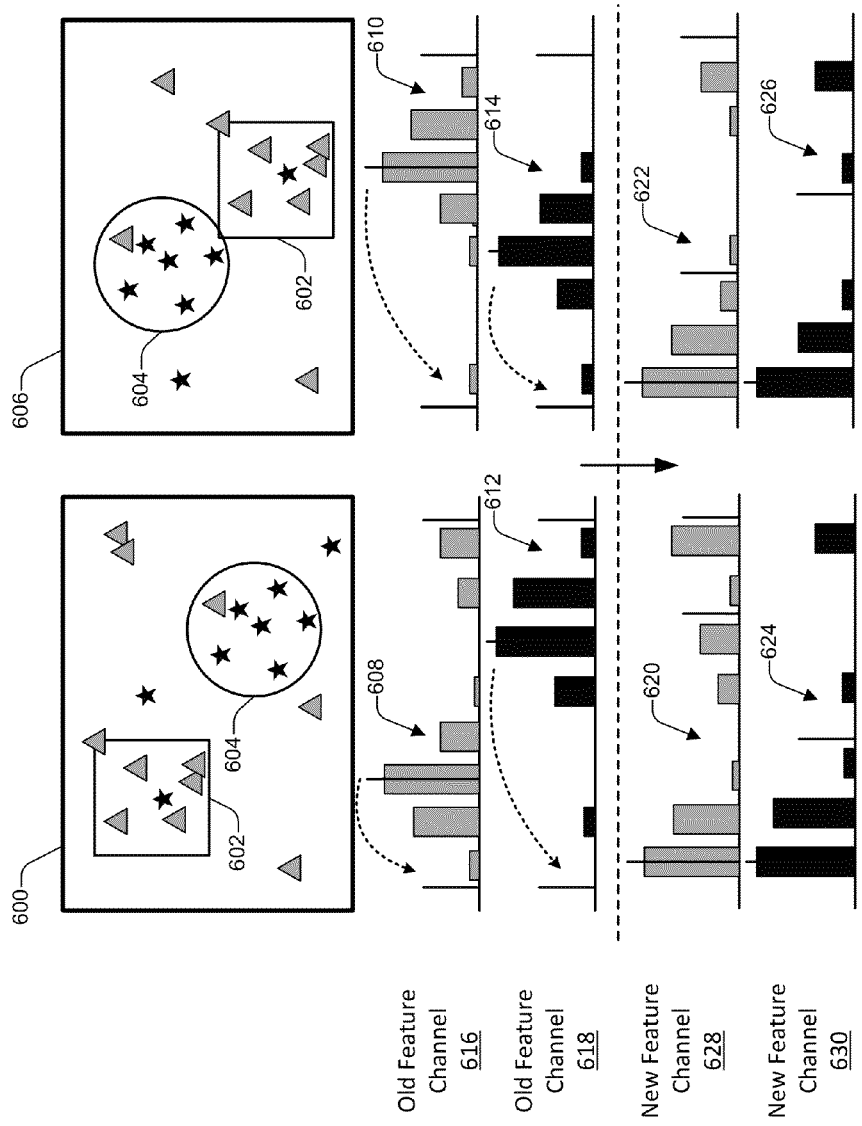

IMAGE RETRIEVAL USING SPATIAL BAG-OF-FEATURES

BACKGROUND

Large-scale image retrieval has a great potential in commercial, industrial and research applications. Based on web searching techniques, example large-scale image retrieval can implement the use of images based on "bag-of-features" or BOF models. Furthermore, such models can include index histograms that represent features of the images. The BOF models and index histograms can be represented by well known inverted file indexing. For example, an inverted file can be an index data structure storing a mapping of image content, where the mapping can include words or numbers associated with the image content.

For large-scale image retrieval, it is desirable to accurately retrieve similar images that are different in scale or size. Although techniques using BOF models and index histograms have shown to be simple and efficient, such techniques can suffer in terms of accuracy and scalability. To improve retrieval accuracy, various approaches have been proposed, such as large vocabularies, soft quantization, and query expansion. A limitation of such approaches is that they typically ignore spatial information of local features, which has been observed to improve retrieval accuracy.

Although certain large-scale image retrieval models have attempted to make use of spatial information (e.g., translation, rotation, or scaling of images) to improve image retrieval accuracy, such models have certain drawbacks. For example, models employing ranking and re-ranking of image search results can provide random access to raw features of the images, but increase memory resources, and slow down search and retrieval.

SUMMARY

This Summary is provided to introduce a selection of concepts in a simplified form that are further described below in the Detailed Description. This Summary is not intended to identify key or essential features of the claimed subject matter; nor is it to be used for determining or limiting the scope of the claimed subject matter.

Some implementations disclosed herein provide techniques for identifying features of various images where there is a spatial variance between corresponding features from one image to another. In certain implementations, histograms are derived based at least in part on spatial variance across multiple images. Descriptors represented by the histograms are used to describe and index the features. The histograms are derived based on linear projections to account for translation, circular projections to account for rotation, and/or scale adjustments to account for scale differences.

BRIEF DESCRIPTION OF THE DRAWINGS

The detailed description is set forth with reference to the accompanying drawing figures. In the figures, the left-most digit(s) of a reference number identifies the figure in which the reference number first appears. The use of the same reference numbers in different figures indicates similar or identical items or features.

FIG. 6 is a pictorial diagram that illustrates defining spatial bags-of-features for images with translated objects.

DETAILED DESCRIPTION

Overview

Described herein are methods and techniques directed to large scale image indexing and retrieval using bag-of-features models to relate geometric information of objects within images. Local features of an image are first projected to different directions or points to generate a series of ordered bags-of-features. Using linear, circular, and scaling relationships, the ordered bags-of-features are modified to generate spatial bags-of-features that minimize object variance between images due to translation, rotation, and scaling. In certain implementations, the most representative features are selected to generate a bag-of-features-like vector representation of an image. Images can be organized according to local features and spatial relationships in an inverted index.

Example System Architecture

Figure 1:
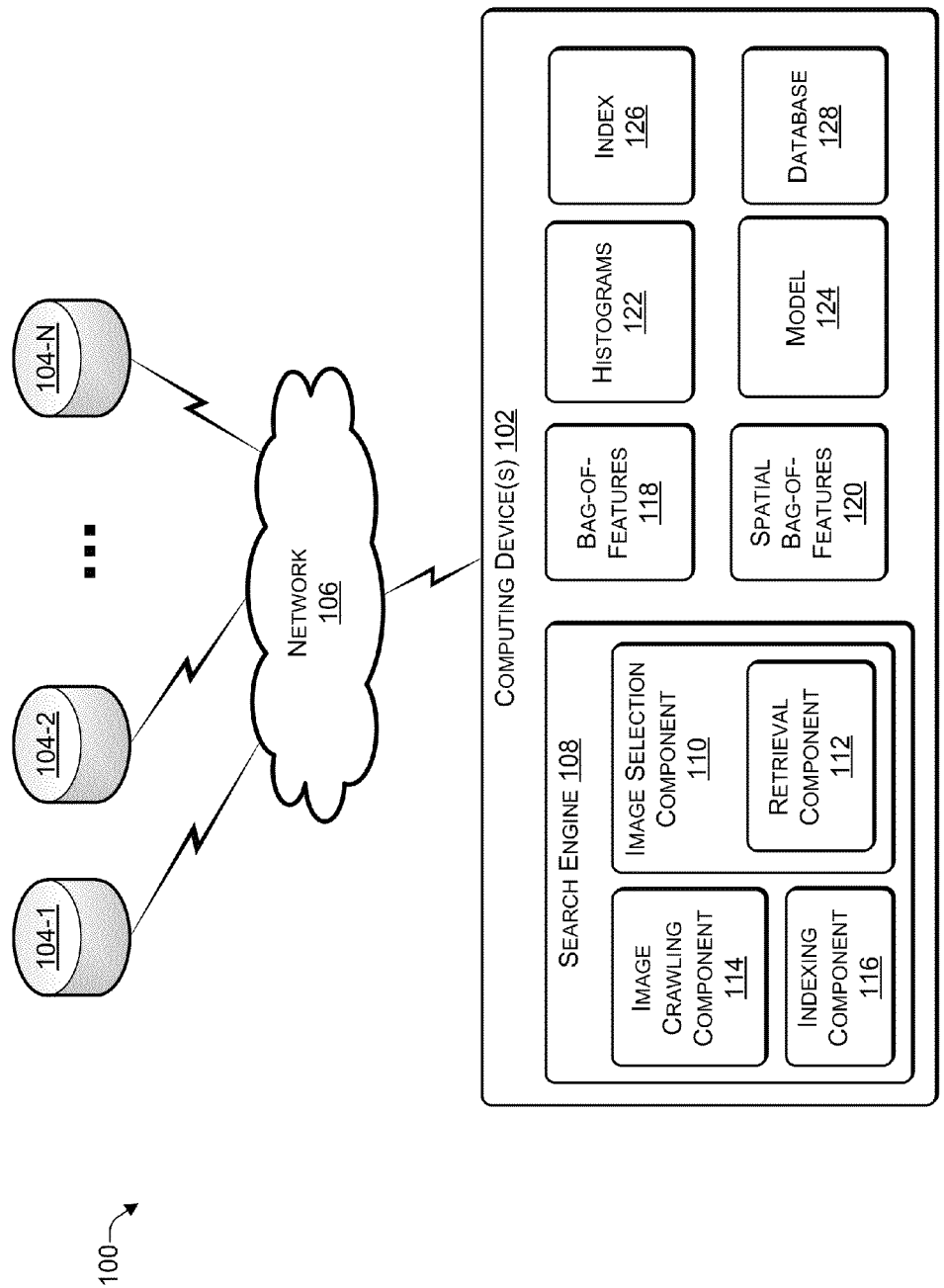
FIG. 1 is a block diagram of an example system architecture for image retrieval using spatial bags-of-features.

FIG. 1 illustrates an example system architecture 100 for image retrieval using spatial bags-of-features, according to some implementations herein. In the illustrated example, architecture 100 includes at least one computing device 102 able to communicate with a plurality of databases 104 that contain images. The databases 104-1, 104-2 . . . 104-N (collectively referred to as databases 104) can be part of various systems/networks/servers, and are connected to computing device 102 through a network 106. Network 106 may be, for example, the Internet, and may connect to the World Wide Web.

Computing device 102 can include a search engine 108. The search engine 108 can include an image selection component 110 configured to select images from databases 104. In an image retrieval stage, image selection component 110 can employ a selection or retrieval component 112. The selection or retrieval component 112 can be used to retrieve or select images that have been indexed based on the described techniques employing spatial bags-of-features.

The search engine 108 can include an image crawling component 114 that is used to select images for indexing. In particular implementations, the search engine 108 can also include an indexing component 116 to index images based on spatial bags-of-features. During an image indexing stage, the indexing component 116 can utilize bag-of-features 118 and spatial bag-of-features 120 obtained from the selected images from image crawling component 114. Histograms 122 can be created based on the selected/crawled images and their bag-of-features 118 and spatial bag-of-features 120.

The bag-of-features 118, spatial bag-of-features 120, and histograms 122 can be used to generate a model 124 and index 126. Index 126 can assign an index value to images. In certain implementations, index 126 can be implemented using known inverted index techniques. Indexed images can be stored in a database 128, or in certain implementations be sent to databases 104. The model 124 and index 126 can be used by retrieval component 112 to search and retrieve images with similar features, accounting for possible spatial variance.

Example Computing Device and Environment

Figure 2:
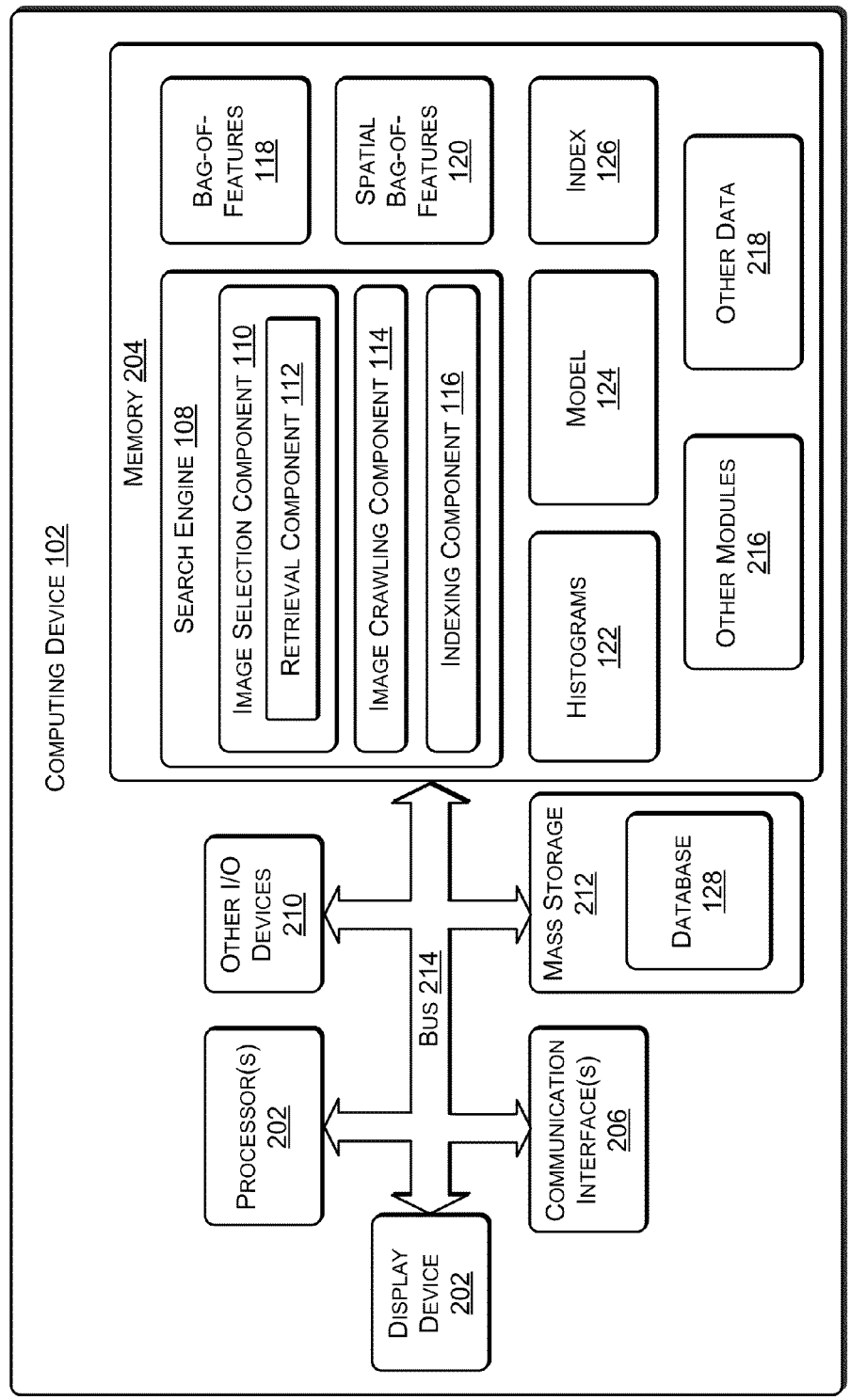
FIG. 2 is a block diagram of an example configuration of a computing device for image retrieval using spatial bags-of-features.

FIG. 2 illustrates an example configuration of the computing device 102 that can be used to implement the components and functions described herein. The computing device 102 can include at least one processor 202, a memory 204, communication interfaces 206, a display device 208, other input/output (I/O) devices 210, and one or more mass storage devices 212, able to communicate with each other, such as via a system bus 214 or other suitable connection.

The processor 202 can be a single processing unit or a number of processing units, all of which can include single or multiple computing units or multiple cores. The processor 202 can be implemented as one or more microprocessors, microcomputers, microcontrollers, digital signal processors, central processing units, state machines, logic circuitries, and/or any devices that manipulate signals based on operational instructions. Among other capabilities, the processor 202 can be configured to fetch and execute computer-readable instructions stored in the memory 204, mass storage devices 212, or other computer storage media. In certain implementations, mass storage devices 212 include database 128.

Memory 204 and mass storage devices 212 are examples of computer storage media for storing instructions which are executed by the processor 202 to perform the various functions described herein. For example, memory 204 can generally include both volatile memory and non-volatile memory (e.g., RAM, ROM, or the like). Further, mass storage devices 212 can generally include hard disk drives, solid-state drives, removable media, including external and removable drives, memory cards, Flash memory, floppy disks, optical disks (e.g., CD, DVD), a storage array, a network attached storage, a storage area network, or the like. Both memory 204 and mass storage devices 212 can be collectively referred to as memory or computer storage media herein. Memory 204 is capable of storing computer-readable, processor-executable program instructions as computer program code that can be executed by the processor 202 as a particular machine configured for carrying out the operations and functions described in the implementations herein.

One or more communication interfaces 206 enable computing device 102 to exchange data with other devices, such as over a network, direct connection, or the like, as discussed above. The communication interfaces 206 can facilitate communications within a wide variety of networks and protocol types, including wired networks (e.g., LAN, cable, etc.) and wireless networks (e.g., WLAN, cellular, satellite, etc.), the Internet and the like. Communication interfaces 206 can also enable communication with external storage (not shown), such as in a storage array, network attached storage, storage area network, or the like.

A display device 208, such as a monitor can be included in some implementations for displaying information to users. Other I/O devices 210 can be devices that receive various inputs from a user and provide various outputs to the user, and can include, for example, a keyboard, a remote controller, a mouse, a printer, audio input/output devices, and so forth.

Memory 204 can include modules and components for web crawling and image selection according to the implementations described herein. In the illustrated example, memory 204 includes the search engine 108 described above that affords functionality for image crawling and indexing to provide search services. For example, as discussed above, search engine 108 can include the image selection component 110, the retrieval component 112, and the image crawling component 114. Additionally, search engine 108 also can include the indexing component 116 for generating the index 126. Memory 204 can also include other data and data structures described herein, such as the bag-of-features 118, spatial bag-of-features 120, histograms 122, and model 124. Memory 204 can further include one or more other modules 216, such as an operating system, drivers, communication software, or the like. Memory 204 can also include other data 218, to carry out the functions described above, and data used by the other modules 216.

The example systems and computing devices described herein are merely examples suitable for some implementations and are not intended to suggest any limitation as to the scope of use or functionality of the environments, architectures and frameworks that can implement the processes, components and features described herein. Thus, implementations described herein are operational with numerous environments or architectures, and can be implemented in general purpose and special-purpose computing systems, or other devices having processing capability. Generally, any of the functions described with reference to the figures can be implemented using software, hardware (e.g., fixed logic circuitry) or a combination of these implementations. The term "module," "mechanism" or "component" as used herein generally represents software, hardware, or a combination of software and hardware that can be configured to implement prescribed functions. For instance, in the case of a software implementation, the term "module," "mechanism" or "component" can represent program code (and/or declarative-type instructions) that performs specified tasks or operations when executed on a processing device or devices (e.g., CPUs or processors). The program code can be stored in one or more computer-readable memory devices or other computer storage devices. Thus, the processes, components and modules described herein can be implemented by a computer program product.

Although illustrated in FIG. 2 as being stored in memory 204 of computing device 102, image selection component 110, or portions thereof, can be implemented using any form of computer-readable media that is accessible by computing device 102. As described herein, computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer storage media does not include communication media.

Furthermore, this disclosure provides various example implementations, as described herein and as illustrated in the drawings. However, this disclosure is not limited to the implementations described herein and illustrated in the drawings, but can extend to other implementations, as would be known or as would become known to those skilled in the art. Reference in the specification to "one implementation," "this implementation," "these implementations," or "some implementations" means that a particular feature, structure, or characteristic described is included in at least one implementation, and the appearances of these phrases in various places in the specification do not necessarily refer to the same implementation.

Image Features

Figure 3:
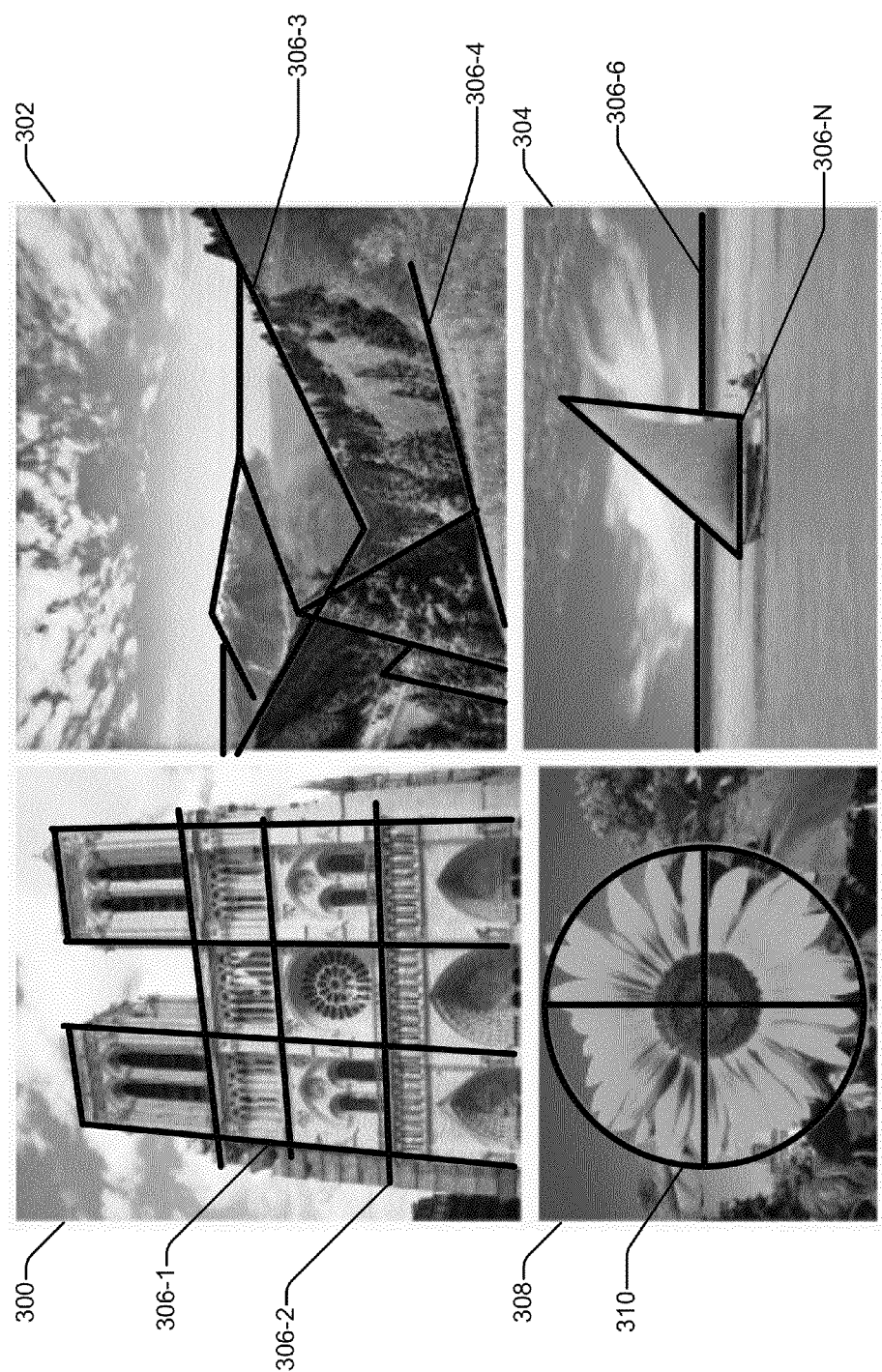
FIG. 3 is a pictorial diagram of local features of various images.

FIG. 3 illustrates local features of various images. Images, such as buildings 300, landscapes 302, and seascapes 304 frequently have local features having horizontal and vertical relationships, as represented by representative lines 306 (i.e., lines 306-1 to 306-N). Images or objects, such as images containing the sun and/or flowers, such as image 308, can have local features having circle-like relationships, as represented by circle 310.

By projecting features onto certain lines or circles, basic geometric information of images can be captured, and an ordered bag-of-features can be created. However, in terms of spatial constraints, such as translation, rotation, and scaling, the projection of features can be too rigorous. Therefore, spatial bags-of-features can be implemented on histogram operations based on the linear and circular relationships as described below. In particular, the histogram operations can include calibration, equalization, and decomposition.

To tune parameters and select the most effective features for indexing and searching, the methods and techniques described below are implemented. Because the proposed spatial bag-of-features can be formatted similar to a traditional bag-of-features, inverted file techniques similar to those used with traditional bags-of-features can be implemented to index images. Without increasing existing memory resources related to indexing, information used in ranking can be implemented with inverted files. This property can lead to faster and more efficient ranking of images.

Ordered Bag-of-Features

As discussed, linear and circular relationships can be used in describing or relating image features. Such relationships can be used for ordered bags-of-features, including spatial bags-of-features.

Bag-of-feature representations can be particularly used to encode image objects' geometric information, and to enable efficient retrieval. The techniques can make use of two-dimensional spatial information of local descriptors of an image. Descriptors can be defined as identifiers for clustered local features of an image. Local descriptors which reside on a two-dimensional space can be projected to a one-dimensional space. The projected features can roughly capture geometric information of objects of images, while representing a type of bag-of-features.

Figure 4A:
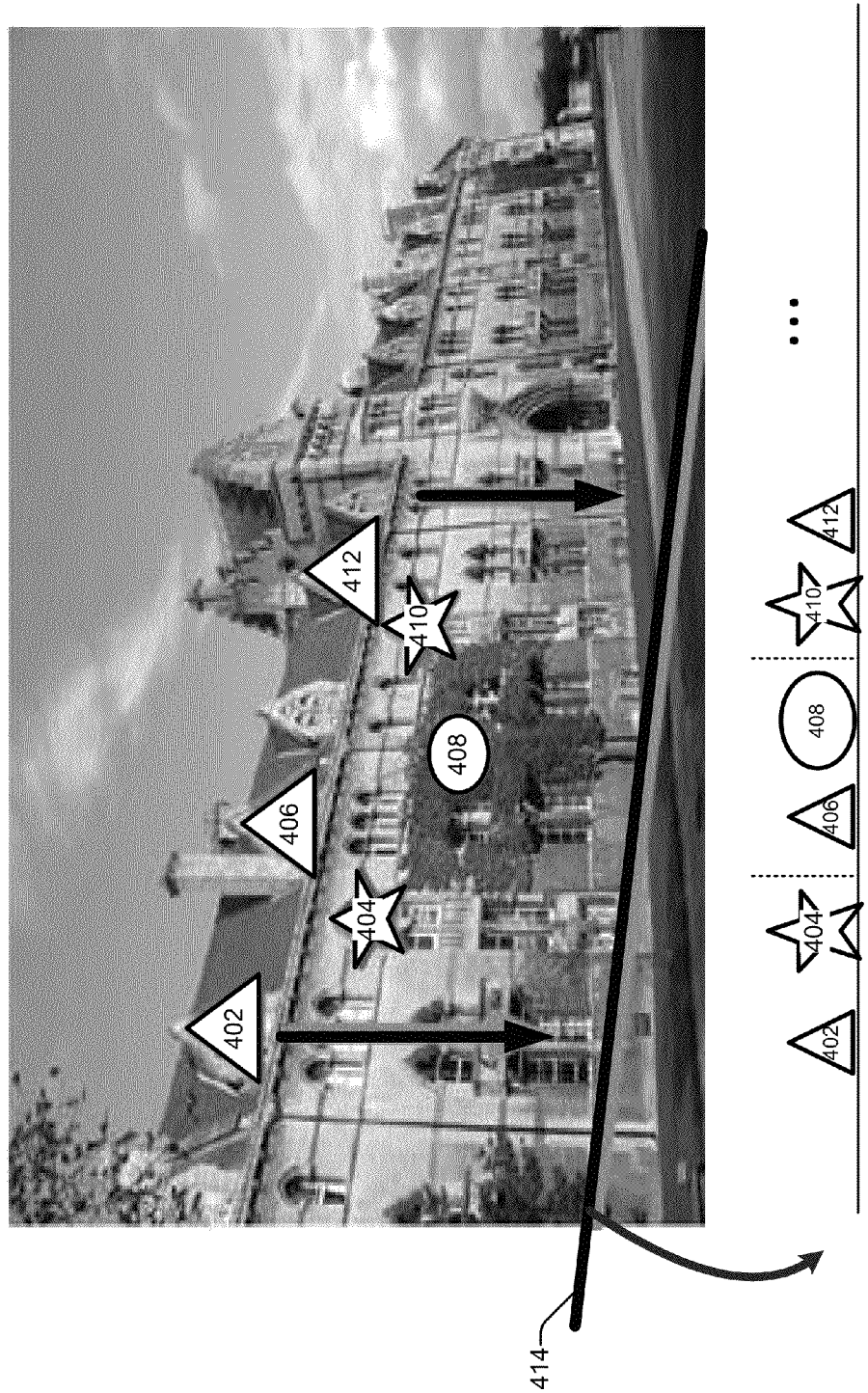
FIG. 4A is a pictorial diagram that illustrates a linear projection.
Figure 4B:
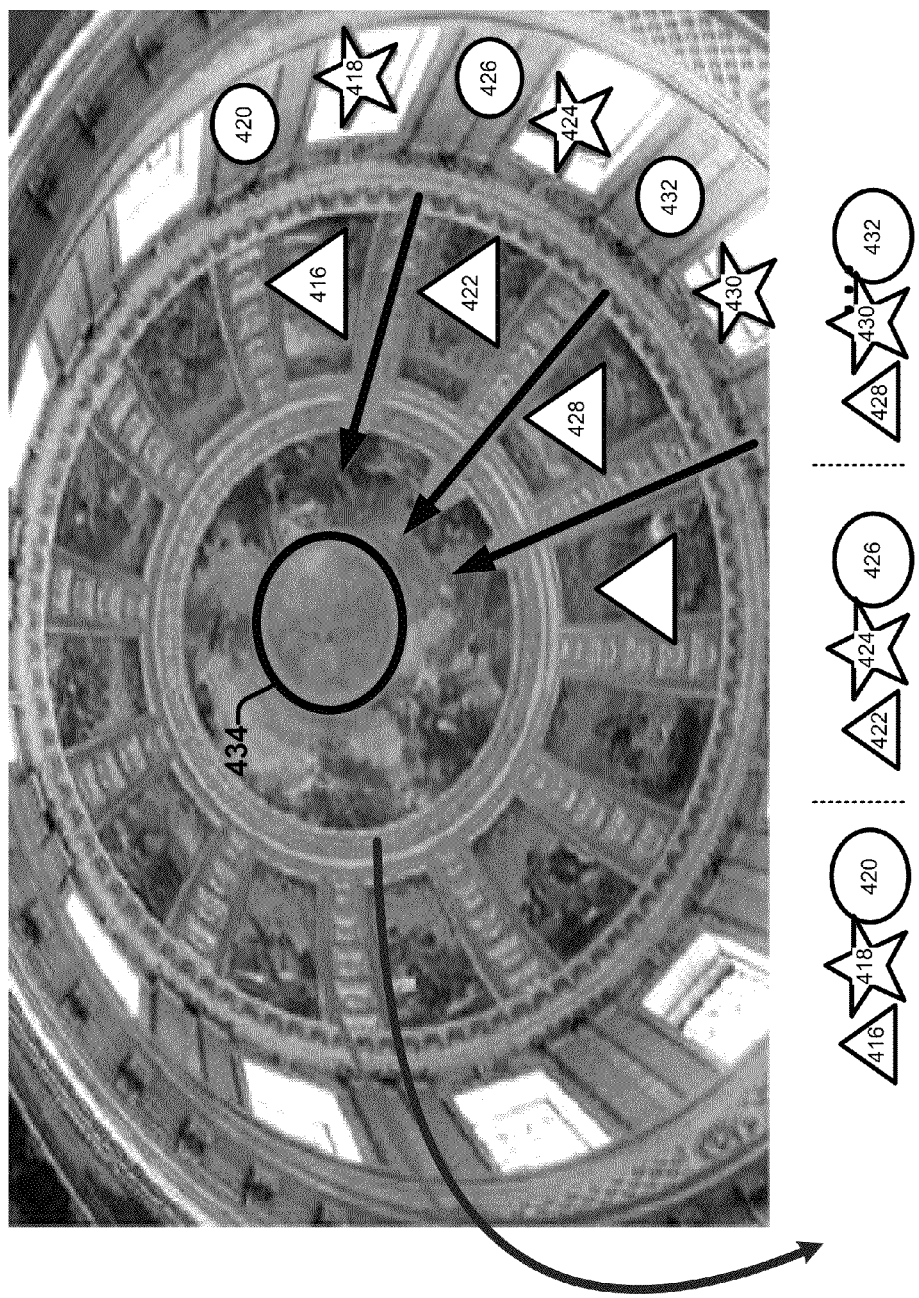
FIG. 4B is a pictorial diagram that illustrates a circular projection.

Linear projection and circular projection are two projection strategies used to generate an ordered bag-of-features. A line and a circle are two basic elements that can be used to represent an object and to represent spatial relationships between objects. For example, natural objects (e.g., mountains, sun, and flowers) and man-made objects (e.g. buildings, windows, and chairs) can be simply sketched out using lines and circles. An ordered bag-of-features based on linear and/or circular projections may reflect basic geometric relationships between objects. For example, FIG. 4A illustrates a linear projection of objects 402, 404, 406, 408, 410, and 412 in an intrinsic order in one direction onto a line 414. FIG. 4B illustrates a circular projection, preserving feature alignment or order in a polar coordinate system, of objects 416, 418, 420, 422, 424, 426, 428, 430, and 432 onto circle 434. An ordered bag-of-features has similar representations as a traditional bag-of-features, and can serve as the foundation of a spatial bag-of-features.

Figure 5A:
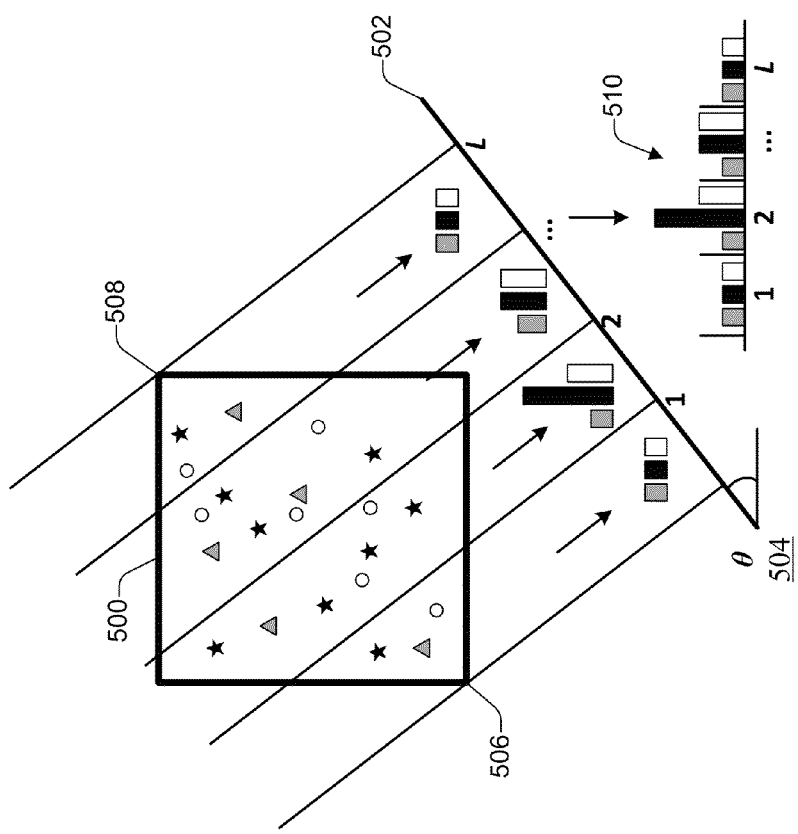
FIG. 5A is a pictorial diagram that illustrates a linear projection for an ordered bag-of-features.

Fundamental spatial information can include locality to depict the configuration of an image. FIG. 5A illustrates an example of linear projection. As shown in FIG. 5A, features (as represented by stars, triangles, and circles) of an image 500 are projected from a two-dimensional (x, y) space (i.e., the image 500 plane) onto a line 502 with an arbitrary angle 504, by which the locality of each feature is transformed to a one-dimensional coordinate along the line 502.

Implementing known "subdivide and disorder" techniques, the line 502 is divided into equal segments. In this example, line 502 is segmented between a point that corresponds to the leftmost corner 506 of image 500 and a point that corresponds to the rightmost corner 508 of image 500. Each segment (in this example, designated as 1, 2, . . . , L) is considered as a bin. Histogram statistics (or sub-histogram statistics) can be leveraged to represent features in a bin. In this example, L also represents the number of bins. L bins are connected to form a long histogram 510, which is designated as a linear ordered bag-of-features.

The linear projection has two degrees of freedom, in particular, the measure of angle 504 (represented as $\Theta$), which represents the specific orientation to preserve, and the number of bins L, which controls the resolution of divisions along line 502. Based on this method, a long histogram (e.g., 510) with L connected sub-histograms (e.g., histograms corresponding to segments 1, 2, . . . , L) can be generated for each image (e.g., 500), which represents general locality information along the direction of angle 504.

Figure 5B:
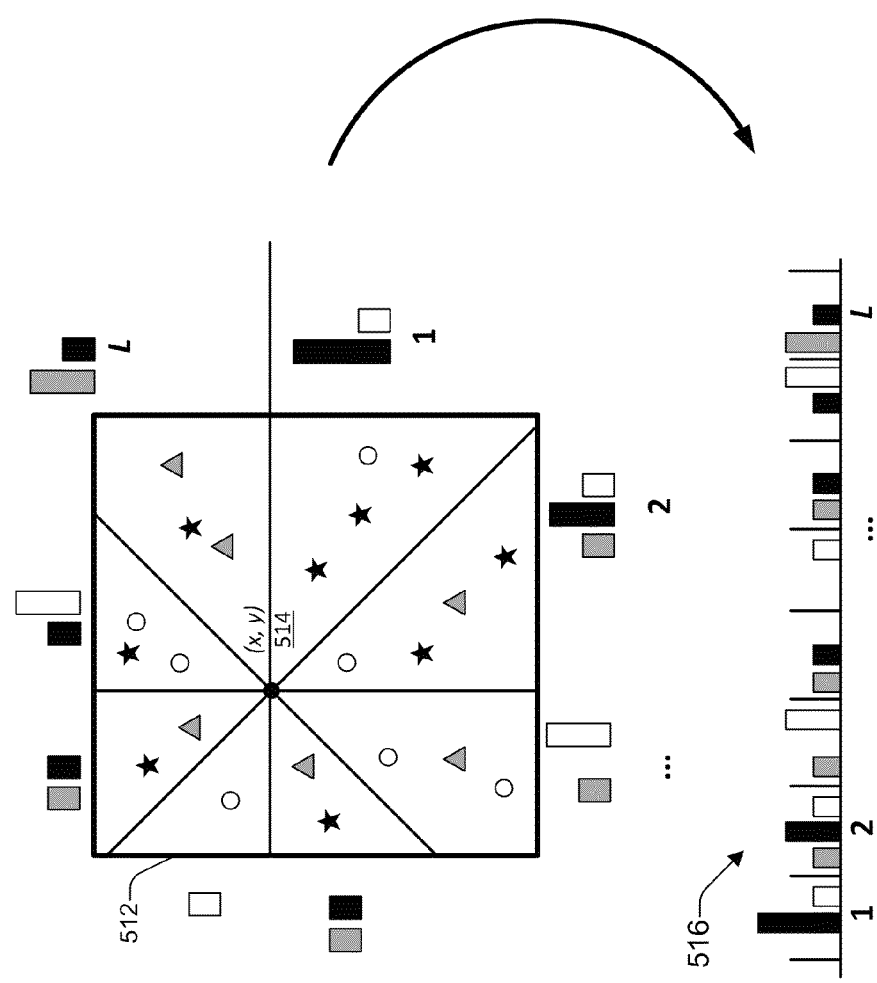
FIG. 5B is a pictorial diagram that illustrates a circular projection for an ordered bag-of-features.

In order to capture geometric information of objects represented by more complex curves, and to provide for object rotation variance, circular projection can be used for ordered bag-of-features. FIG. 5B illustrates an example of circular projection. Image 512 includes various objects or features, represented by stars, triangles, and circles. A center (x, y) 514 of a circle to be used for the projection is defined. From the center (x, y) 514, a two-dimensional space is divided into multiple sectors, each having the same radian. Similar to linear projection, each sector is considered as a bin (e.g., bins 1, 2, . . . , L) and a sub-histogram is used to represent the features in each sector. The sub-histograms are combined to create a long histogram 516. Circular projection has two parameters, in particular, the location of center (x, y) 514, and the number of bins L. With this method, locality relationships in the polar coordinate system with focus at center (x, y) 514 can be captured using a circular projection, and the locality precision in this polar coordinate system is determined by the number L of sectors. In the same manner as linear projection, different centers and resolutions can be implemented to deal with multiple cases. For example, although center (x, y) 514 is shown within the bounds of image 512, a circular projection may be defined for which the center is located outside the bounds of the image.

Image Matching Using Ordered Bag-of-Features

The term $\Theta$ is used to represent the parameters $\{L, \Theta\}$ of a linear projection or to represent the parameters $\{L, (x, y)\}$ of a circular projection. For a histogram $H^{\Theta}$ generated by either a linear projection or a circular projection with parameters $\Theta$ and resolution L, a histogram $H^\ominus$ can be formed by concatenating L sub-histograms as defined by the following equation (1):

$$H^\ominus = [h^{1,\ominus}, h^{2,\ominus}, \ldots, h^{L,\ominus}] \quad (1)$$

where the term $h^{i,\ominus}$ represents the sub-histogram in the $i^{th}$ bin of the projection parameterized by $\ominus$.

Assume P and Q are two images to be compared. Their similarity based on a particular feature can be defined by the following equation (2):

$$<H_P^\ominus, H_Q^\ominus> = \sum_{i=1}^{L} Sim(h_P^{i,\ominus}, h_Q^{i,\ominus}) \quad (2)$$

where Sim(•,•) is defined as a histogram similarity measure, such as cosine similarity or histogram intersection. The computational complexity is linear to the number of features. In certain cases, measurement is made to measure similarity between histograms generated from an identical projection. However, by enumerating multiple projections, a family of histogram representations can be obtained for each image.

Spatial Bag-of-Features

Although the ordered bag-of-features can encode/represent basic spatial information of local descriptors of an image, the ordered bag-of-features can be too rigorous to tolerate different spatial variations of objects, such as translation, rotation, and scaling. In other words, ordered bag-of-features may not properly match images that differ based on object translation, rotation, or scaling, etc.

FIG. 6 illustrates an example of two images with features differences attributed at least in part to translation. An image 600 has features 602 and 604 that are translated in a second image 606. By applying linear projection of ordered bag-of-features as described above, histograms 608, 610, 612, and 614 are derived. Histogram 608 represents features 602 in image 600; histogram 610 represents features 602 in image 606; histogram 612 represents features 604 in image 600; and histogram 614 represents features 604 in image 606. As illustrated in FIG. 6, histograms 608 and 610 are similar in content, but differ in order. Similarly, histograms 612 and 614 are similar in content but also differ in order. The differences in order between the histograms of image 600 and the histograms of image 606 are due to translation variance between the two images.

Translation Variance

Histogram calibration can be implemented in the spatial bags-of-features to account for the translation variance between images. The term $H^\ominus$ denotes a histogram generated by a linear projection. If there are V features in a quantified dictionary, there will be V feature channels, where a feature channel (e.g., feature channels 616 and 618) represents a sub-histogram extracted from the whole histogram, if consideration is made as to distribution of one specific feature (i.e., a visual word). The whole histogram has length L, where L is the number of bins in $H^\ominus$. For each feature v, its channel is denoted by $H_v^\ominus$ as represented by the following equation (3).

$$H_v^\ominus = [h_v^1, h_v^2, \ldots, h_v^{m-1}, h_v^m, h_v^{m+1}, \ldots, h_v^L] \quad (3)$$

where $h_v^i$ is the frequency of feature v in bin i. The term $h_v^i$ can be used to denote $h_v^{i,\ominus}$ for short. Denote m=arg $\max_i\{h_v^i\}$.

A vector can be defined with a starting position m to get a new histogram defined by the following equation (4).

$$T_v^\ominus = [h_v^m, h_v^{m+1}, \ldots, h_v^{L-1}, h_v^L, h_v^1, \ldots, h_v^{m-1}] \quad (4)$$

A new histogram $T^\ominus$ is obtained by grouping $T_v^\ominus$, v=1, 2, ..., V to be one new long histogram by the inverse process of extracting $H_v^\ominus$, v=1, 2, ..., V from $H^\ominus$. Referring back to FIG. 6, new feature channel 628 includes calibrated histogram 620, which corresponds to original histogram 608, and calibrated histogram 622, which corresponds to original histogram 610. Similarly, new feature channel 630 includes calibrated histogram 624, which corresponds to original histogram 612, and calibrated histogram 626, which corresponds to original histogram 614. By this new representation, a comparison of histograms 620 and 622, and a comparison of histograms 624 and 626, better illustrates the similarities between the two images 600 and 606.

Rotation Variance

Figure 7:
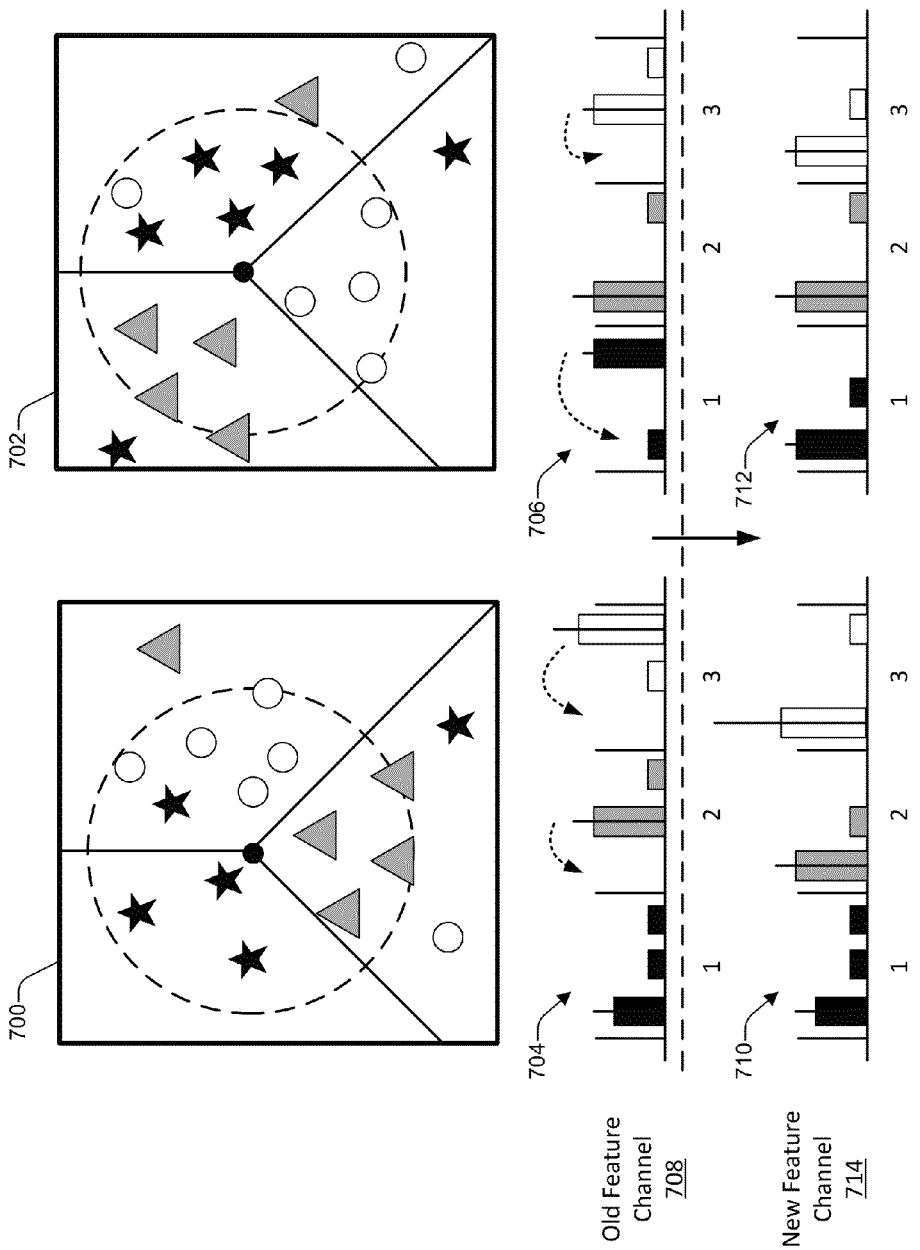
FIG. 7 is a pictorial diagram that illustrates defining spatial bags-of-features for images with rotated objects.

FIG. 7 illustrates an example of two images that differ at least in part based on a rotation. An image 700 has features (as represented by stars, triangles, and circles) that are rotated in a second image 702. In this example, a circular projection can be used to create histograms for ordered bags-of-features. Similar calculations as described above with regard to translation variance can be applied to account for rotation variance. In other words, the histogram calibration used to account for translation variance can also be used to account for rotation variance to derive new feature channels having similar distributions.

As shown in FIG. 7, histogram 704 representing features of image 700 is different than histogram 706 representing features of image 702. In other words, due to a rotational transformation between the two images, corresponding features are located in different bins (see feature channel 708).

The histogram calibration to account for rotation variance involves similar application as the histogram calibration described above to account for translation variance, replacing the term $H^\ominus$ above, with the term $R^\ominus$. After histogram calibration, histogram 710 representing features of image 700 is similar to histogram 712 representing features of image 702, and corresponding sectors of the images 700 and 702 are matched, as illustrated by feature channel 714.

Scaling Invariance

Figure 8:
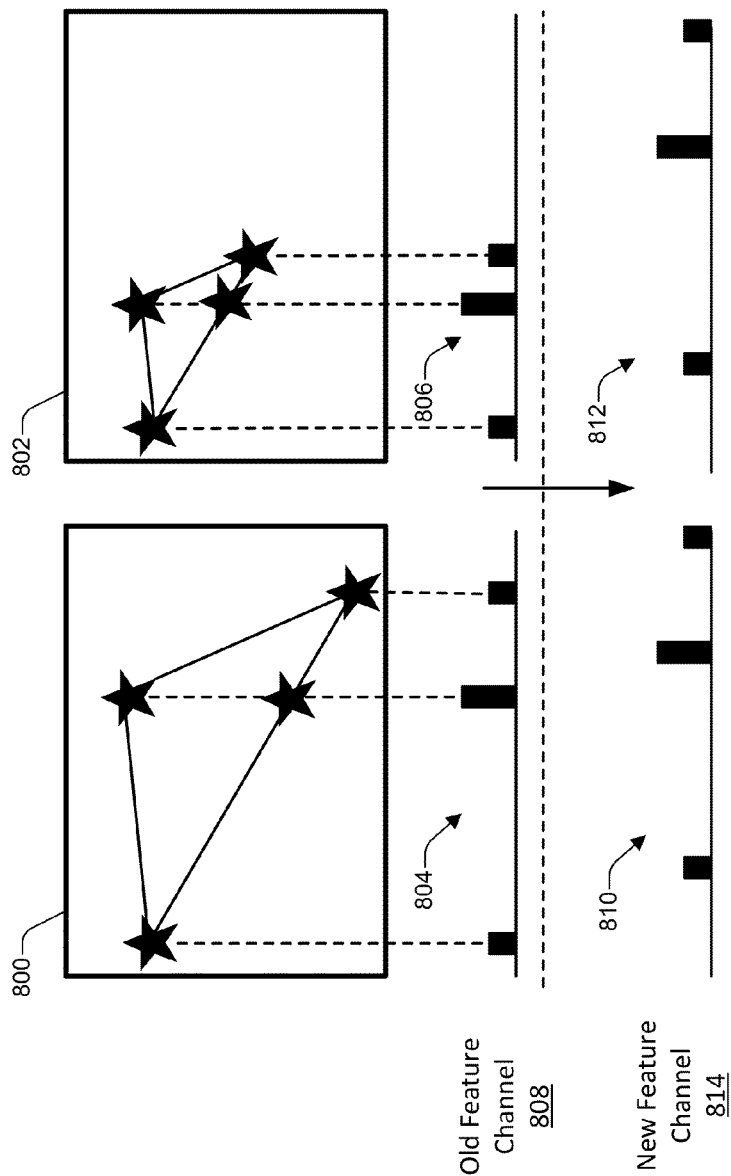
FIG. 8 is a pictorial diagram that illustrates defining spatial bags-of-features for images with scaled objects.

FIG. 8 illustrates an example of two images that differ at least in part based on scaling. Two images 800 and 802 include an identical object (as represented by four stars), but the object is sized differently in the two images. Using linear projection (i.e., projecting onto a line), the histogram 804 (of image 800) and histogram 806 (of image 802) have similar distributions, but with different widths, as represented by old feature channel 808. This may cause the corresponding visual features to fall into different bins. In order adjust or calibrate the histograms, histogram calibration is performed, similar to calibration directed to translation variance described above.

In reference to calibration techniques directed at translation variance described above, the object frequency $h_v^t$, which originally belongs (as defined by linear projection) to bin t is relocated to bin s by the following equation (5).

$$S = \left\lceil \frac{\sum_{i=1}^{t} h_v^i}{\sum_{i=1}^{L} h_v^i} \right\rceil \quad (5)$$

This calibration technique allows for adjacent bins to be merged together in certain feature channels. In this way, a new histogram $S^\ominus$ is obtained, in which the distribution of the feature channel extends to the full width of the image. This new histogram represents a new spatial bag-of-features that is less sensitive to scaling. This is illustrated in FIG. 8 with histogram 810 (representing image 800) and histogram 812 (representing image 802) of new feature channel 814.

Although, this example of calibration to account for scaling variance is applied to a liner projection of an ordered bag-of-features, similar techniques and methods can also be applied to a circular projection of an ordered bag of-features.

Long Histogram Decomposition

The above examples are generally directed to a small number of objects/features of images. When addressing spatial variance of features across multiple images, it can be difficult to accurately describe images, particularly through the use of the described histograms. In other words, histograms describing images can be complex and identifying similar histograms can be difficult.

Therefore, in certain implementations, instead of selecting or focusing on a complete histogram, the focus can be narrowed to a smaller combination of individual bins, which can still be considered a descriptive histogram. The similarity measure of the final representation can be represented by the following equation (6):

$$<\mathcal{H}_P, \mathcal{H}_Q> = \Sigma_{\Phi \in S} \alpha^\Phi sim(h_P^\Phi, h_Q^\Phi) \qquad (6)$$

where $\Phi = \{\Theta, k(k<=L)\}$, in which L is the number of bins of the projection (before or after calibration) parameterized by $\Theta$, and k is the identifier of the bin. The term S represents a selected projection set that can be learned through a supervised manner. This method can be used to decompose a global spatial constraint into several partial spatial constraints, while retaining the ability to present the global spatial constraint if all bins of a projection are selected. Furthermore, complex images can be described while avoiding conflicts between different types of spatial bags-of-features.

In certain implementations, it may be desirable to discard or ignore certain insignificant information, allowing for a more simplified image representation, which may also increase efficiency in retrieving images. For example, in certain cases, heavy clutter or occlusion may be present in images. This method allows for the final image representation to focus on potential target objects/features, and ignore meaningless or distractive objects/features.

Figure 9:
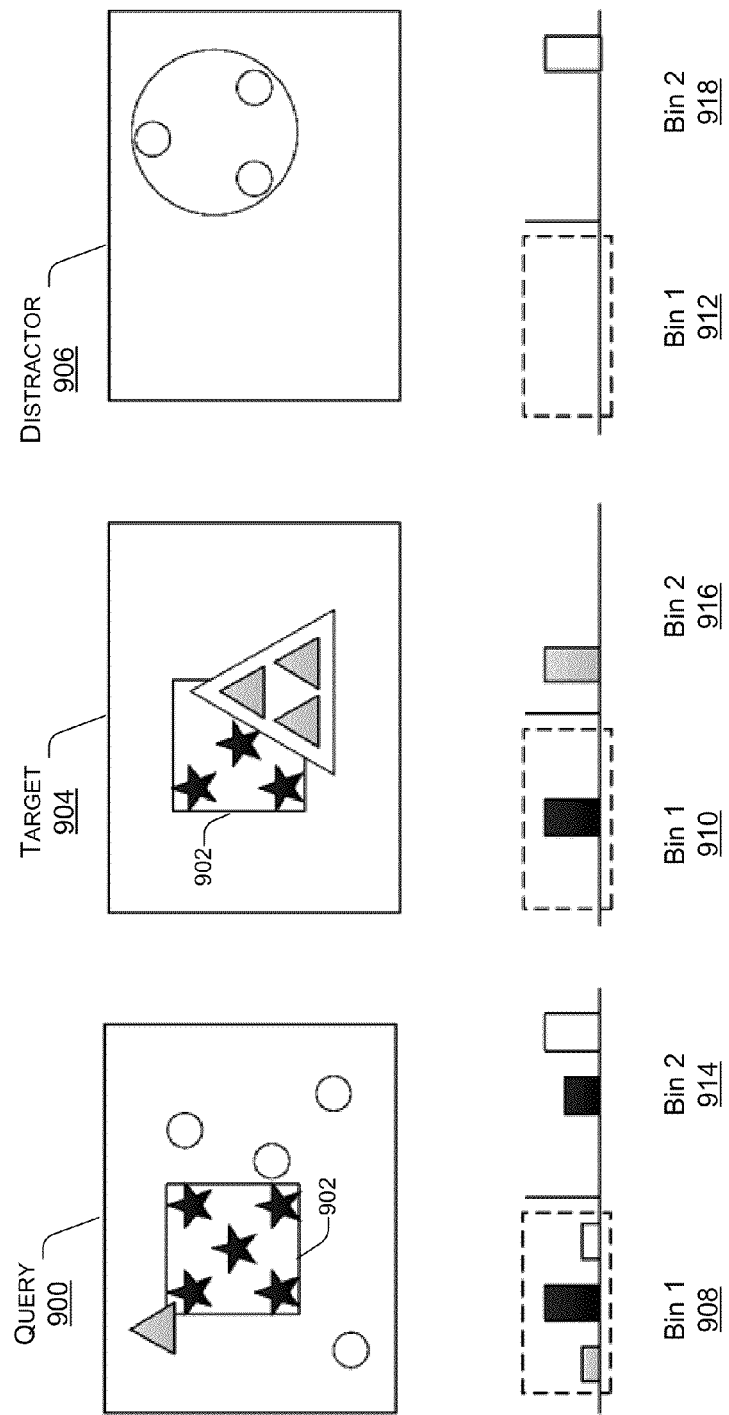
FIG. 9 is a pictorial diagram that illustrates eliminating distractive objects/features in image retrieval.

FIG. 9 illustrates query, target, and distractor images. Query image 900 contains a query object square 902 and clutter objects/features (i.e., the circles and triangle that lie outside of the query object square 902). Target image 904 contains the query object square 902 and other objects, denoted by the triangles. Distractor image 906 does not include the query object square 902, but does include other objects/features. Although target image 904 and distractor image 906 have objects/features in common with query image 900, they also contain clutter objects/features that are not common with query image 900. Therefore, if the goal is to select images based on the query object square 902, using the global histogram technique described above, Bin 1 908 of image 900 is chosen and compared to Bin 1 910 of image 904 and Bin 1 912 of image 906. Bin 2 914, Bin 2 916, and Bin 2 918 are not compared. By selecting only Bins 1 910, 912, and 914, the distractor image 906 is excluded, since Bin 1 912 has no represented features similar to Bin 1 908.

Image Retrieval

Pertinent or salient image regions can be detected using various known region detection techniques. For a detected region, a descriptor as described above can be determined.

Although a series of spatial bags-of features may have different parameters, not all of the parameters may be useful for given image datasets. Therefore, ranking can be implemented to select the most effective configurations. A ranking algorithm can implement a training set. Given a query image, images in the training set can be ordered according to their relevance to the query image. In this way, ordered image pairs can be constructed.

In a learning operation using the training set, each image feature can be regarded as a weak ranker, and cosine is adopted to calculate ranking scores. For example, in a linear projection, ten equidistant angles are identified in the space [0°, 180°]. For circular projection, regular grid points (e.g., 5×5=25) in a plane can be tried as centers. With respect to the histogram resolution L, four levels (for example, the values 3, 7, 15 and 31) are set. Therefore, in total, there are (10+25)× 4=140 original feature histograms (i.e., 10=number of equidistance angles, 25 regular grid points and four levels). Because of three extra variances for translation, rotation and scaling, the family of histograms becomes 140×3=420 spatial bags-of-features. Since each long histogram can be decomposed to single bins, instead of 140 long histograms, there can be a total of (10+25)×3×(3+7+15+31)=5880 sub-histograms to be further selected.

By running the iteration N times, a set $S$ of preferred spatial bags-of-features, can be obtained. Each feature in $S$ defines a similarity function and a corresponding weight. The terms $\mathcal{H}_{Q\ Q}$ and $\mathcal{H}_{\mathcal{P}\ P}$ are used as final representations of images P and Q. The visual similarity between P and Q can be determined by Equation 6 above.

Indexing Structure

Various known indexing structures can be implemented. An inverted file index is one such indexing structure to index high dimensional sparse feature vectors. However, most such structures use a single histogram and add extra features for re-ranking. However, it is contemplated to have images represented by a set of selected sub-histograms, and not using extra features in the ranking (re-ranking) process. Spatial bags-of-features, as described by their histograms, can be compressed in a single inverted file.

Figure 10:
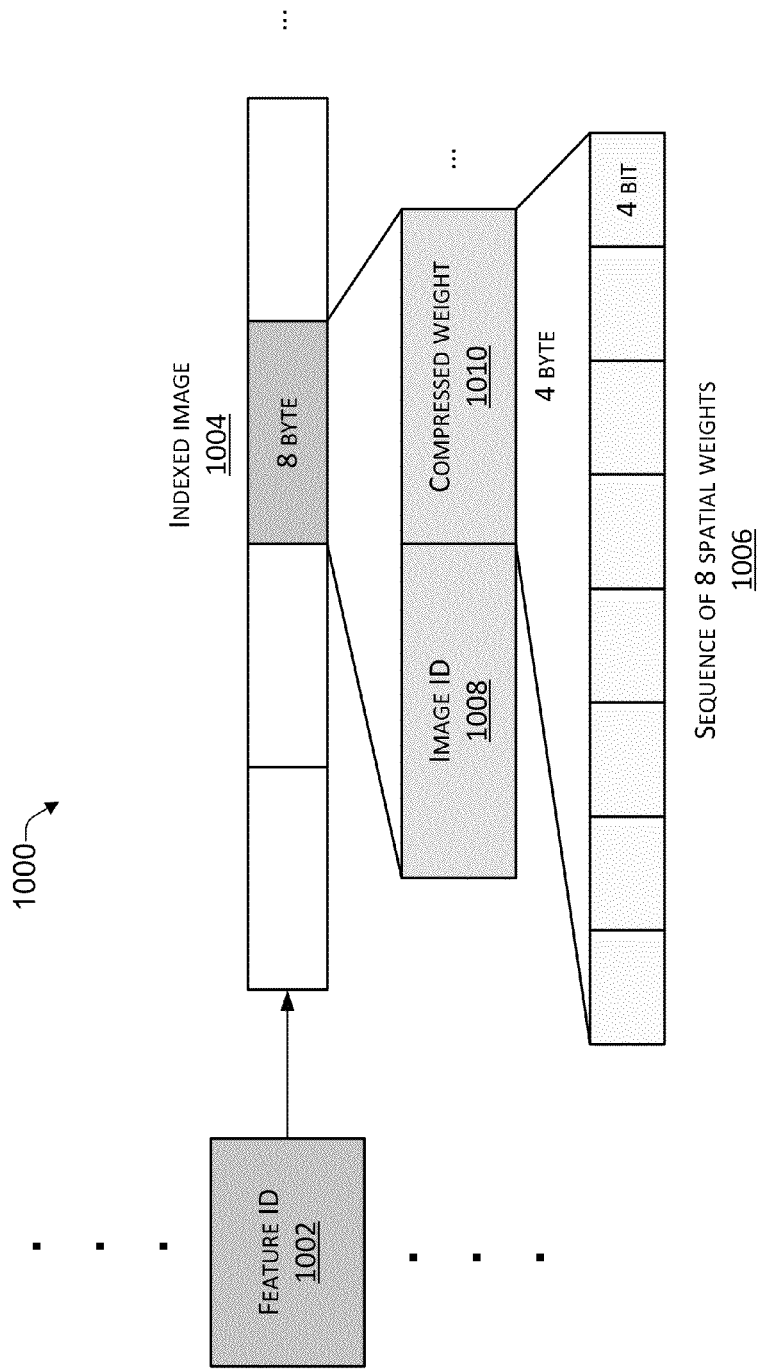
FIG. 10 is a block diagram that illustrates an example inverted file data structure.

FIG. 10 illustrates an inverted file data structure. In particular, the data structure 1000 is a compressed inverted file structure that makes use of the techniques and methods described as to spatial bags-of-features. Histograms or feature identifiers, shown as feature ID 1002 are associated with various indexed images. In this example, feature ID 1002 is associated with indexed image 1004. For certain implementations, 4 bits are used to save the weight of an particular feature of an index image, under one feature configuration. In certain cases, the real value of a histogram (e.g., feature ID 1002) can be quantized to 16 levels. As an example, eight different spatial bags-of-features are selected, as shown by the sequence of eight spatial weights 1006. Therefore, an 8 byte word describing index image 1004 includes a 4 byte image ID 1008. The compressed inverted file weight 1010 is also 4 bytes. In certain implementations, the size of the compressed inverted file (i.e., image 1004) with spatial bags-of-features is the same as that of an inverted file of ordered bags-of-features without spatial information.

Example Index and Retrieval Process with Spatial Bag-of-Features

Figure 11:
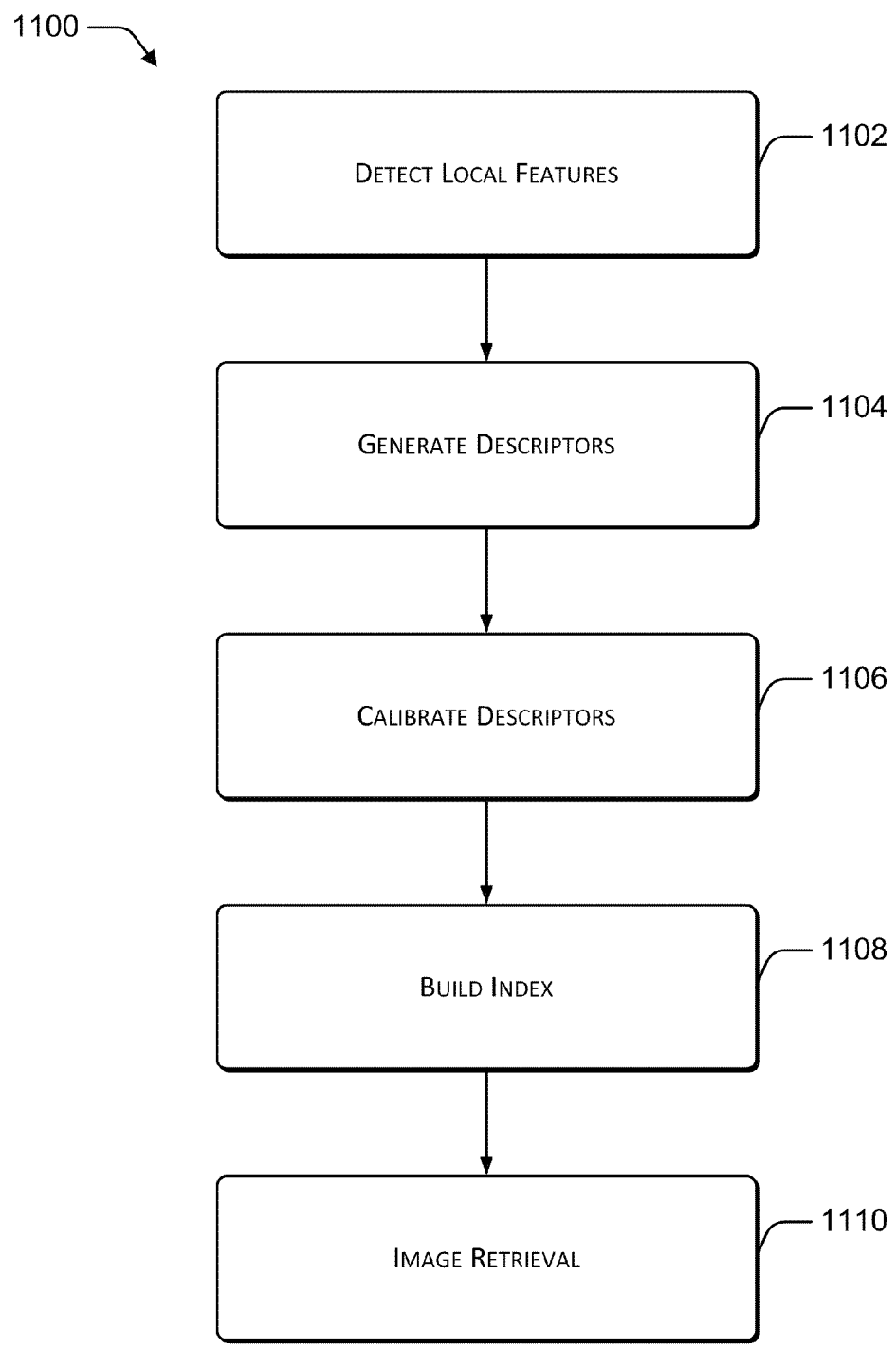
FIG. 11 is a flow diagram that illustrates an example process for indexing images using spatial bags-of-features.

FIG. 11 illustrates an example process 1100 for indexing and retrieving images based on spatial bags-of-features as described herein. The process 1100 is illustrated as a collection of blocks in a logical flow graph, which represent sequences of operations that can be implemented in hardware, software, or a combination thereof. In the context of software, the blocks represent computer-executable instructions stored on one or more computer storage media that, when executed by one or more processors, cause the processors to perform the recited operations. Note that the order in which the process is described is not intended to be construed as a limitation, and any number of the described process blocks can be combined in any order to implement the process, or alternate processes. Additionally, individual blocks may be deleted from the process without departing from the spirit and scope of the subject matter described herein. Furthermore, while this process is described with reference to the system architecture 100 and computing device 102 described above with reference to FIG. 1 and FIG. 2, other computer architectures may implement one or more portions of this process, in whole or in part.

At block 1102, local features of images are detected. For example, images from various databases (e.g., databases 104, 128) are gathered. The local features of the images are determined. As an example, as described above with reference to FIG. 3, local features may be determined based on linear or circular characteristics. Appropriate linear or circular projections may also be applied to the local features of the images.

At block 1104, descriptors of the local features are generated for the images. Descriptors provide geometric information as to the features or objects of the images. In an example, the descriptors are histogram representations of linear or circular projections of the local features. Such descriptors are implemented using spatial bags-of-features as derived from ordered bags-of-features. As described above, the descriptors provide spatial contextual information of features, which may represent translation, rotation, and scaling between images.

At block 1106, calibration is performed on the descriptors. As discussed above, long histogram decomposition is an example of descriptor calibration, which eliminates insignificant or unneeded information from a histogram representation of an image.

At block 1108, an index of the images is built. In certain cases, images can be ranked in an index, wherein images are assigned ranking scores. For example, an index structure can use an inverted file index. In addition indexed files can be compressed as described above. Indexed files can be placed in one or more databases (e.g., databases 104, 128).

At block 1110, image retrieval is performed. Image retrieval can be performed based on particular features or objects that are desired. In particular, retrieval is performed on the indexed images based on histogram descriptors.

Conclusion

Although the subject matter has been described in language specific to structural features and/or methodological acts, the subject matter defined in the appended claims is not limited to the specific features or acts described above. Rather, the specific features and acts described above are disclosed as example forms of implementing the claims. This disclosure is intended to cover any and all adaptations or variations of the disclosed implementations, and the following claims should not be construed to be limited to the specific implementations disclosed in the specification. Instead, the scope of this document is to be determined entirely by the following claims, along with the full range of equivalents to which such claims are entitled.

The invention claimed is:

1. A method comprising:
   identifying features of an image;
   projecting the features onto a line or a circle;
   creating a histogram descriptor of the features based on the projecting; and
   calibrating the histogram descriptor to minimize a variance between histogram descriptors of two images due to spatial variance of corresponding features between the two images, wherein the calibrating includes reordering features represented in at least one of the histogram descriptors or adjusting a scale of at least one of the histogram descriptors.

2. A method as recited in claim 1, wherein the histogram descriptor of the features represents an ordered bag-of-features.

3. A method as recited in claim 2, wherein the ordered bag-of-features includes a representation of spatial relationships between the features.

4. A method as recited in claim 1, wherein projecting the features onto a line or a circle results in a series of bins of sub-histograms, each of the sub-histograms representing features within a particular area of the image.

5. A method as recited in claim 4, wherein a combination of the sub-histograms creates a long histogram that describes the image.

6. A method as recited in claim 5, further comprising decomposing the long histogram to eliminate particular features.

7. A method as recited in claim 1, wherein the spatial variance of features between the two images is a result of at least one of translation or rotation.

8. A method as recited in claim 1, wherein the spatial variance of features between the two images is a result of scaling.

9. A method comprising:
   for each image of a plurality of images:
      detecting local features of the image;
      generating an ordered bag-of-features descriptor of the local features; and
      calibrating the ordered bag-of-features descriptor to generate a spatial bag-of-features descriptor, wherein the calibrating includes reordering features represented in the ordered bag-of-features descriptor or adjusting a scale of the ordered bag-of-features descriptor; and
   building an index of the plurality of images based on the spatial bag-of-features descriptors.

10. A method as recited in claim 9, wherein the local features are represented by lines or circles.

11. A method as recited in claim 9, wherein generating the ordered bag-of-features descriptor of the local features comprises applying a linear projection to the local features.

12. A method as recited in claim 9, wherein generating the ordered bag-of-features descriptor of the local features comprises applying a circular projection to the local features.

13. A method as recited in claim 9, wherein building the index includes:
   compressing the images;
   ranking the images; and
   implementing an inverted file index.

14. A method as recited in claim 9, further comprising retrieving images that are indexed.

15. A computing device comprising:
   a processor in communication with storage media;
   an image crawling component maintained on the storage media and executed on the processor to retrieve multiple images from one or more databases; and
   an indexing component maintained on the storage media and executed on the processor to:
      identify features of the multiple images;
      project the features onto lines or circles based on linear or circular relationships;
      create histogram descriptors of the features from the projecting; and calibrate the histogram descriptors to account for spatial relationships between the features of the multiple images, wherein the calibrating includes reordering features represented in at least one of the histogram descriptors or adjusting a scale of at least one of the histogram descriptors.

16. A computing device as recited in claim 15, wherein the indexing component projects the features of a particular image as a series of sub-histograms, each sub-histogram representing features of the particular image, the sub-histograms being combined to create a long histogram that describe the particular image.

17. A computing device as recited in claim 16, wherein the indexing component is further executed on the processor to decompose the long histogram to eliminate particular ones of the features.

18. A computing device as recited in claim 15, wherein the indexing component is further executed on the processor to build an index that includes compressed and ranked images, and an inverted file index.

* * * * *